United States Patent
Raghunathan et al.

(10) Patent No.: US 10,790,885 B1
(45) Date of Patent: Sep. 29, 2020

(54) CONTROL OF MIMO CONFIGURATION BASED ON RETRANSMISSION RATE

(71) Applicant: Sprint Spectrum L.P., Overland Park, KS (US)

(72) Inventors: Sathyanarayanan Raghunathan, Herndon, VA (US); Muthukumaraswamy Sekar, Brambleton, VA (US); Maheswaran Vijayakumar, Herndon, VA (US); Suresh Majjara, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/283,150

(22) Filed: Feb. 22, 2019

(51) Int. Cl.
*H04B 7/0452* (2017.01)
*H04W 28/02* (2009.01)
*H04B 7/0456* (2017.01)
*H04L 1/18* (2006.01)
*H04W 28/08* (2009.01)

(52) U.S. Cl.
CPC ......... *H04B 7/0452* (2013.01); *H04B 7/0486* (2013.01); *H04L 1/1812* (2013.01); *H04W 28/0205* (2013.01); *H04W 28/08* (2013.01)

(58) Field of Classification Search
CPC ............... H04B 7/0452; H04B 7/0486; H04W 28/0205; H04W 28/08
See application file for complete search history.

(56) References Cited

U.S. PATENT DOCUMENTS

| | | | | |
|---|---|---|---|---|
| 2007/0011550 | A1* | 1/2007 | Agrawal | H04B 7/0697 714/746 |
| 2014/0044206 | A1* | 2/2014 | Nammi | H04B 7/0417 375/267 |
| 2014/0064392 | A1* | 3/2014 | Jonsson | H04L 1/0026 375/267 |
| 2014/0133471 | A1* | 5/2014 | Nammi | H04L 1/0025 370/336 |
| 2014/0245095 | A1* | 8/2014 | Nammi | H04L 5/006 714/749 |
| 2015/0049742 | A1* | 2/2015 | Zhao | H04L 1/1812 370/336 |
| 2017/0163318 | A1* | 6/2017 | Byun | G01S 3/72 |
| 2018/0324007 | A1* | 11/2018 | Nammi | H04L 25/03929 |
| 2018/0332572 | A1* | 11/2018 | Liu | H04B 7/0452 |
| 2019/0342843 | A1* | 11/2019 | Raghavan | H04L 1/0009 |

* cited by examiner

*Primary Examiner* — Gary Mui

(57) ABSTRACT

When a base station has reason to increase the extent of MU-MIMO service that it can provide or in other contexts, the base station could select at least one of the base station's served UEs to have its MIMO rank reduced, with the selecting being based at least on a determination that the selected UE has had a threshold high rate of data retransmissions such as a threshold high rate of HARQ retransmissions for instance.

20 Claims, 5 Drawing Sheets

CONTROL OF MIMO CONFIGURATION BASED ON RETRANSMISSION RATE

BACKGROUND

A wireless communication system typically includes a number of base stations that are configured to provide wireless coverage areas, such as cells and cell sectors, in which user equipment devices (UEs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the system could engage in air interface communication with a base station and could thereby communicate via the base station with various remote network entities or with other UEs served by the base station.

Each coverage area in such a system could operate in accordance with a particular radio access technology, with air-interface communications from the base stations to UEs defining a downlink or forward link and air-interface communications from the UEs to the base stations defining an uplink or reverse link.

Over the years, the industry has embraced various "generations" of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive-MIMO, beamforming, and/or other features, to support higher data rates and countless applications, such as mission-critical services, enhanced mobile broadband, and massive Internet of Things (IoT).

In accordance with the radio access technology, each coverage area could operate on a carrier, which could be frequency division duplex (FDD), defining separate frequency channels for downlink and uplink communication, or time division duplex (TDD), with a single frequency channel multiplexed over time between downlink and uplink use. Further, on the downlink and uplink, the air interface could be divided over time into frames, each divided in turn into subframes, timeslots, and symbol time segments, and the carrier bandwidth could be divided over frequency into subcarriers, with subcarriers and symbol time segments cooperatively defining resource elements that could be grouped within each timeslot to define physical resource blocks (PRBs) in which the subcarriers can be modulated to carry data.

The base station could then be configured to coordinate use of these air-interface resources on an as-needed basis. For example, when the base station has data to transmit to a UE, the base station could allocate particular downlink PRBs to carry at least a portion of that data to the UE as a transport block, and could accordingly transmit the data to the UE on the allocated downlink PRBs. And when a UE has data to transmit to the base station, the UE could transmit to the base station an uplink resource request, the base station could responsively allocate particular uplink PRBs to carry at least a portion of the data as a transport block, and the UE could then transmit the data to the base station on the allocated uplink PRBs.

For both downlink and uplink communication in this process, the base station could also receive channel-quality-indicator (CQI) reports from its served UEs and could use those CQI reports as a basis to select and coordinate use of an appropriate modulation and coding scheme (MCS) to be used for data communication between the base station and the UE. The MCS may define a coding rate that establishes how much redundancy data should be added to an underlying data transmission in order to establish a data stream that will be transmitted over the air between the base station and the UE. And the MCS may further define a modulation scheme that establishes how many bits of that resulting data stream will be modulated per resource element and thus how much of the data stream can be carried per PRB. In practice, the UE's reported CQI may map to an MCS that should facilitate communication with sufficiently low error rate given the UE's channel conditions.

When a UE has a lower-reported CQI, the base station may select and coordinate use of a lower-order MCS that results in effectively less of the underlying data being transmitted per PRB between the base station and the UE, thus providing lower effective data rate per PRB for the UE. Whereas, when a UE has a higher-reported CQI, the base station may select and coordinate use of a higher-order MCS that results in effectively more of the underlying data being transmitted per PRB between the base station and the UE, thus providing higher effective data rate per PRB for the UE.

Overview

One of the key performance metrics of a wireless communication system is its spectral efficiency, namely, the extent of data that the system can carry per unit of frequency spectrum. The spectral efficiency of a wireless communication system or its base stations could be measured as a quantity of bits per Hertz.

If a wireless communication system has low spectral efficiency, a provider of the system may need to configure the system with additional licensed spectrum, such as wider carriers and/or more carriers, in order to accommodate subscriber communication needs. However, adding licensed spectrum could be costly and therefore undesirable.

One way to help improve spectral efficiency is to make use of MIMO technology.

With MIMO, a base station can engage in air interface communication concurrently on multiple different radio-frequency (RF) propagation paths, or MIMO "layers," with multiple layers occupying the same frequency resources (e.g., subcarriers and PRBs) as each other. To facilitate this, the base station could be equipped with a MIMO antenna array, comprising multiple transmit antennas and multiple receive antennas. By suitably weighting and precoding transmissions by particular antennas in the array, the base station can then output spatially separate but concurrent transmissions for receipt by its served UEs. Because these concurrent transmissions occupy the same frequency resources (e.g., subcarriers) as each other, MIMO can thereby support a greater extent of data communication per unit frequency, thereby increasing the base stations' spectral efficiency and possibly avoiding or deferring the need to add more spectrum.

MIMO service could be used to increase the data rate of transmission to a given UE, by multiplexing communications to the UE onto multiple separate MIMO layers using the same air-interface resources as each other. For instance, when a base station has data to transmit to a UE, the base station could time-division-multiplex the data into multiple data streams, the base station could modulate the data streams onto the same PRBs as each other, and the base station could output the modulated data streams onto separate antenna ports for concurrent transmission on separate respective propagation paths to the UE. In practice, the UE could have two or more antennas, and the UE could estimate the channel distortion at each of its antennas and use the estimates to separately compute and uncover each of the base station's transmit signals on those PRBs.

For this purpose service, the base station could determine based on control signaling from a UE how many MIMO layers to configure for communication with the UE. For instance, the UE could periodically evaluate the quality or performance of its air interface with the base station (e.g., signal-to-interference-plus-noise ratio (SINR), carrier-to-interference-plus-noise ratio (CINR), and/or frame error rate (FER)). And based on that evaluation and/or other analysis, the UE could establish and report to the base station a MIMO "rank" (or rank index (RI)) that maps to a maximum quantity of MIMO layers that the base station could use for communication with the UE.

In a representative implementation, a lower MIMO rank could map to a lower maximum quantity of MIMO layers, and a higher MIMO rank could map to a higher maximum quantity of MIMO layers. For instance, MIMO rank 1 might map to use of just 1 MIMO layer, MIMO rank 2 might map to use of 2 MIMO layers, and MIMO rank 4 might map to use of 4 MIMO layers. Thus, based on the UE's reported MIMO rank, the base station select quantity of MIMO layers to allocate for the UE, and the base station might configure its communication with the UE to use that number of MIMO layers.

Further, MIMO can also be used in a "multi-user MIMO" (MU-MIMO) configuration to increase the data capacity of the air interface by allowing communications to multiple UEs to use the same air-interface resources as each other. For instance, a base station can modulate data streams destined to each of multiple UEs on the same PRBs as each other and can transmit the modulated data streams on a separate respective propagation paths for receipt by the UEs. To facilitate this, the base station could pre-code transmissions on each propagation path using weighted coefficients based on channel estimates from the UEs, in a manner that enables each UE to remove cross-talk and receive its intended data. Further, the base station could beamform the transmissions respectively to each UE to help physically distinguish the transmissions from each other. In theory, MU-MIMO could thus increase the data capacity of the air interface by allowing a base station to serve more UEs at a time without requiring additional air-interface resources.

To facilitate MU-MIMO service, the UEs that will share PRBs should be orthogonal to each other, meaning that each UE could receive spatially separate transmissions from the base station without undue interference from the base station's transmissions to each other UE. Thus, when a base station is going to apply MU-MIMO (perhaps in response to the base station being heavily loaded with connected UEs with high throughput requirements), the base station could select a group of UEs to be a MU-MIMO group based on the UEs being orthogonal to each other. The base station could deem the UEs to be sufficiently orthogonal to each other if each UE has reported threshold high SINR and/or if one or more other orthogonality criteria are met.

When a base station serves a group of UEs with MU-MIMO together on shared PRBs, the base station could further allocate multiple MIMO layers on those PRBs to each of one or more members of the MU-MIMO group. For instance, the base station might group together four UEs for MU-MIMO service on a set of shared PRBs and might serve each of those UEs respectively on two MIMO layers on those PRBs, among other possibilities.

In dense urban markets and other areas, wireless service providers may face a need to provide an increased extent of MIMO service. In particular, in such areas, a provider may serve a great many UEs or may otherwise need to support high aggregate throughput, but the provider may have limited available spectrum, such as a limited number of PRBs per timeslot. To help overcome that limitation, the provider may equip its base stations with a massive-MIMO antenna array.

While a traditional MIMO antenna array may include on the order of 2 to 8 antennas, a massive-MIMO antenna array would include many more antennas, perhaps on the order of tens, hundreds, or even thousands of antennas. For instance, a representative massive-MIMO antenna array could include 128 antennas, of which 64 might be configured as transmit antennas and the other 64 might be configured as receive antennas. With this arrangement, depending on the number of transmit antennas used per layer (e.g., to facilitate beamforming), and depending on the number of transmitters employed by the base station, the base station might be able to support on the order of up to 16 MIMO layers, or possibly 32 or more MIMO layers, per PRB.

When providing MU-MIMO service using such a massive-MIMO antenna array or the like, at issue may be how many MIMO layers the base station should allocate respectively to each UE in the MU-MIMO group (not necessarily the same quantity per UE). As noted above, a UE's reported MIMO rank could be the basis for this decision.

Unfortunately, however, with the base station supporting up to only a limited number of MIMO layers, the number of MIMO layers that the base station allocates respectively to each UE in a MU-MIMO group could restrict how many UEs the base station can include per MU-MIMO group. For instance, with the example rank mappings noted above, if the base station supports up to only 16 MIMO layers, then the base station could include up to just 4 UEs with MIMO rank 4 in a MU-MIMO group, the base station could include up to 8 UEs with MIMO rank 2 in a MU-MIMO group, and the base station could include up to 16 UEs with MIMO rank 1 in a MU-MIMO group.

Given this, one way to help increase the availability and use of MU-MIMO service when a base station is heavily loaded (e.g., with a high number of connected UEs and a high rate of PRB utilization) is for the base station to artificially lower the MIMO rank of one or more of its served UEs. For instance, if a UEs have reported MIMO rank 4, the base station could adjust the MIMO rank of each of those UEs to be MIMO rank 2 instead, so that the base station would allocate fewer MIMO layers to those UEs and the base station could group together a greater number of those UEs for MU-MIMO service.

At issue in this process, however, is which one or more of the base station's served UEs should have their MIMO rank reduced.

A potential problem with reducing any given UE's MIMO rank is that the UE would then be served on fewer MIMO layers and may therefore experience lower throughput than it would otherwise. Consequently, reducing the rank of a UE might be undesirable.

On the other hand, disclosed herein is a mechanism to help address this issue. In accordance with the disclosure, when a base station has reason to increase the extent of MU-MIMO service that it can provide, such as when the base station's air interface is heavily loaded, the base station will select at least one of the base station's served UEs to have its MIMO rank reduced, with the selecting being based at least on a determination that the selected UE has had a threshold high rate of data retransmissions, such as a threshold high rate of Hybrid Automatic Repeat Request (HARQ) retransmissions.

Reducing the MIMO rank of a UE that has a high rate of data retransmissions may result in increasing that UE's MCS order, which may in turn help offset the reduction in throughput that would result from serving the UE on a reduced number of MIMO layers. This is because transmission on a reduced number of MIMO layers may correlate with a reduced block error rate (BLER), which may in turn lead to the UE reporting a higher CQI that maps to a higher-order MCS. Using the higher-order MCS, as discussed above, may then provide the UE with a higher effective data rate per PRB. And that higher effective data rate may help offset the reduction in throughput that the UE would otherwise experience from being served on a reduced number of MIMO layers.

Further, in selecting a UE to have its rank reduced based on the UE having a threshold high rate of data retransmissions, the base station could additionally focus on UEs that have had especially high PRB utilization, perhaps UEs that have had threshold large transport-block allocations for instance. Thus, the base station could select a UE based on the UE having had a threshold high rate of data retransmission and the UE additionally having had threshold large transport block size. And the base station could reduce the MIMO rank of that selected UE so that the base station would then serve that UE with a reduced number of MIMO layers and the base station may be able to include that UE in a larger MU-MIMO group.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate aspects by way of example only and not by way of limitation.

DETAILED DESCRIPTION

Figure 1:
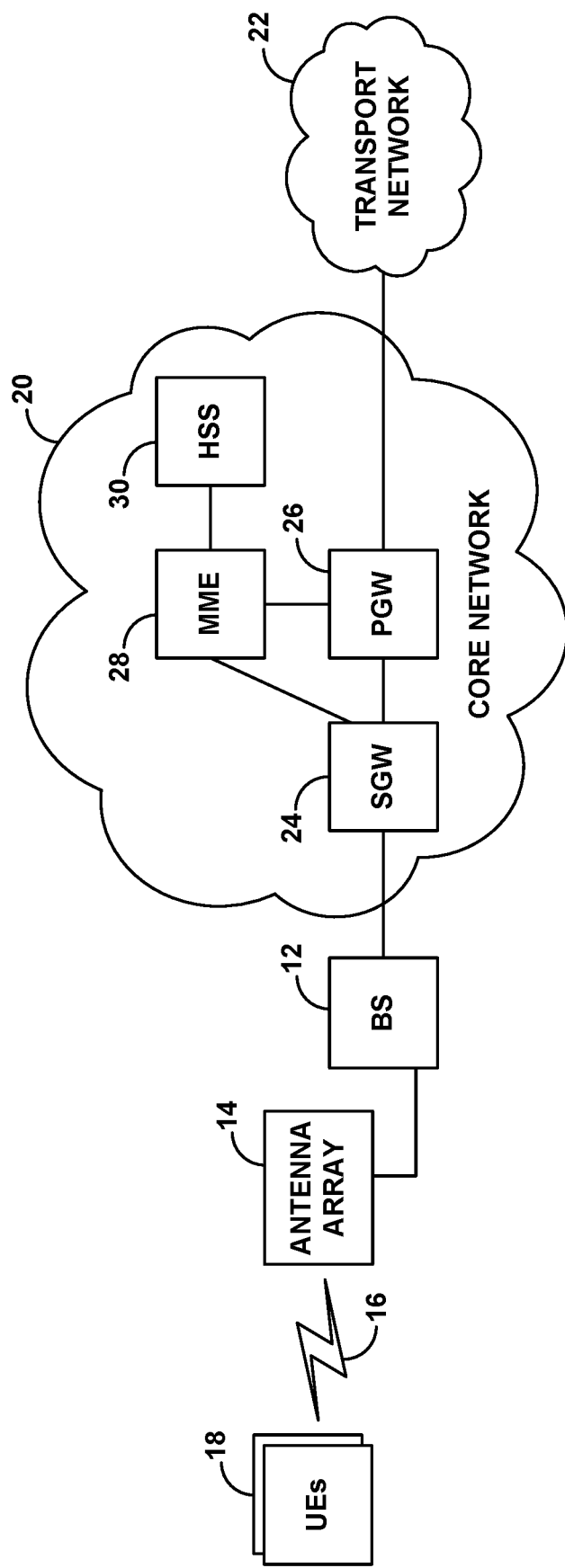
FIG. 1 is a simplified block diagram of a network arrangement in which aspects of the present disclosure can be implemented.

Referring to the drawings, as noted above, FIG. 1 is a simplified block diagram of an example wireless communication system in which various disclosed features can be implemented. It should be understood, however, that numerous variations from this and other disclosed arrangements and operations are possible. For example, elements or operations could be added, removed, combined, distributed, re-ordered, or otherwise modified. In addition, operations described as being performed by one or more entities could be implemented in various ways, such as by a processor executing instructions stored in non-transitory data storage, along with associated circuitry or other hardware, for instance.

As shown in FIG. 1, the example wireless communication system includes a representative base station 12 having an antenna array 14 through which the base station is configured to provide coverage 16 on one or more carriers in one or more frequency bands. Shown operating within coverage of the base station are then a plurality of UEs 18, which could be devices of the type discussed above, among other possibilities.

The base station could be a macro base station of the type configured to provide a wide range of coverage, and the antenna array could be mounted on a tower or other tall structure. Alternatively, the base station could take other forms, such as a small cell base station, a repeater, a femtocell base station, or the like, which might be configured to provide a smaller range of coverage. The base station could be configured to operate according to a 4G, 5G, or other radio access technology. For instance, the base station could be an LTE evolved Node-B (eNB) or a 5GNR gigabit Node-B (gNB), among other possibilities.

The base station is shown coupled with a core network 20, which could be an enhanced packet core (EPC) network, next generation core (NGC) network, or another network including components supporting an applicable radio access technology and providing connectivity with at least one transport network 22, such as the Internet.

In an example implementation as shown, the core network 20 includes a serving gateway (SGW) 24, a packet data network gateway (PGW) 26, a mobility management entity (MME) 28, and a home subscriber server (HSS) 30. In particular, the base station has an interface with the SGW, the SGW has an interface with the PGW, and the PGW provides connectivity with the transport network. Further, the base station has an interface with the MME, and the MME has an interface with the SGW and the HSS.

With this arrangement, the SGW and PGW cooperatively provide user-plane connectivity between the base station and the transport network, to enable a UE served by the base station to engage in communication on the transport network. And the MME operates as a controller to carry out operations such as coordinating UE attachment and setup of user-plane bearers. Further, the HSS includes or has access to a data store containing UE capabilities and service profile data and can work with the MME to facilitate UE authentication.

As discussed above, the air interface between the base station and UEs within its coverage could be structured to define various air interface resources.

For instance, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the base station operates could be divided into subcarriers with specified subcarrier spacing on the order of 15 to 240 kHz. With this arrangement, the air interface on each carrier would define an array of resource elements each occupying a subcarrier and symbol time segment, and the base station and UEs could communicate with each other through modulation of the subcarriers to carry data in those resource elements. Variations of this arrangement are possible as well.

Further, particular groupings of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the base station to UEs. And other resource elements per subframe could be reserved to define a shared channel in which PRBs could carry scheduled data communications from the base station to UEs.

Further, in certain subframes, a group of resource elements centered on the center frequency of each carrier could be reserved to carry synchronization signals that UEs could detect as a way to discover coverage of the base station on the carrier and to establish frame timing. And in certain subframes, a group of resource elements also centered on the center frequency of the carrier could be reserved to define a broadcast-channel for carrying system information messages, such as master information block (MIB) and system information block (SIB) messages that WCDs could read to obtain operational parameters such as carrier bandwidth and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the base station. And other resource elements per subframe could be reserved to define a shared channel in which PRBs could carry scheduled data communications from UEs to the base station. Further, still other resources on the uplink could be reserved for other purposes as well, such as for carrying uplink reference signals or the like.

In operation, when a UE enters into coverage of the base station on a carrier, the UE could detect the base station's synchronization signal and could then read the base station's MIB or the like to determine the carrier's bandwidth. Upon determining that reference-signal strength on the carrier is sufficiently high, the UE could then engage in random access signaling and Radio Resource Control (RRC) configuration signaling with the base station to connect with the base station on the carrier, thus putting the UE in an RRC-connected mode.

Once the UE is connected with the base station, the UE could then transmit to the base station an attach request if appropriate, which the base station could forward to the MME for processing. And after working with the HSS to authenticate the UE, the MME could coordinate setup for the UE of one or more user-plane bearers between the base station and the PGW, to enable the UE to engage in communication on the transport network. Further, the base station could establish for the UE one or more corresponding radio bearers and an associated context record, and the base station could receive from the UE and/or the HSS (via the MME) a set of capabilities and profile data for the UE and could store that data in the context record for reference while serving the UE.

The base station could then serve the UE with data communications as discussed above.

For instance, when data arrives at the base station for transmission to the UE, the base station could allocate one or more downlink PRBs in a subframe for use to transmit at least a portion of the data, defining a transport block, to the UE. The base station could then transmit to the UE in the control region of that subframe a Downlink Control Information (DCI) message that designates the PRBs, and the base station could accordingly transmit the transport block to the UE in those designated PRBs.

For each such downlink transmission, the UE could then determine if the UE received transport block successfully. For instance, the transmission could carry a cyclic redundancy check (CRC) value computed based on the transport block, and the UE could compute a CRC based on the received transport block and determine whether its computed CRC matches that carried by the transmission and could send an associated HARQ control message to the base station.

If the UE receives the transmission and determines that the CRC matches or otherwise that the UE received the transport block successfully, then the UE could transmit to the base station a positive acknowledgement (HARQ ACK) control message, and the base station could then proceed with transmission of a next transport block (if any) to the UE. Whereas, if the UE did not receive the transmission or determined that the CRC did not match and thus that there was an error in the received transport block, then the UE could transmit to the base station a negative acknowledgement (HARQ NACK), in response to which the base station could attempt the transmission again.

On the other hand, when the UE has data to transmit to the base station (e.g., for transmission on the transport network), the UE could transmit to the base station a scheduling request that carries with it a buffer status report (BSR) indicating how much data the UE has buffered for transmission. And in response the base station, could allocate one or more uplink PRBs in an upcoming subframe for carrying a transport block of that data from the UE and could transmit to the UE a DCI message that designates those upcoming PRBs. The UE could then accordingly transmit the transport block to the base station in the designated PRBs.

As with downlink transmission, for each transport block that the UE transmits to the base station, the base station could determine if the transport block arrived successfully, based on a CRC analysis for instance. And if the base station received the transmission successfully, then the base station could transmit to the UE a HARQ ACK and could schedule a next uplink transmission from the UE. Whereas, if the base station did not receive the transmission successfully, then the base station could transmit to the UE a HARQ NACK, and the UE could attempt retransmission to the base station.

For present purposes and/or for other purposes, the base station could also compute and record in the UE's context record an indication of the UE's rate of data retransmission, or information that facilitates determining the UE's rate of data retransmission. This rate of data retransmission could be for the downlink and/or the uplink and could be a percentage of transmissions between the base station and the UE that needed to be retransmitted (e.g., for which a HARQ NACK was sent), measured over a sliding window of time, among other possibilities. For instance, considering downlink transmissions over a 10 minute sliding window, if 25% of the downlink transmissions to a UE have resulted in the UE responding with a HARQ NACK, then the base station could record the UE's rate of data retransmission as 25%.

While the base station is so serving a connected UE, the UE could also transmit various operational information to the base station to assist with the base station's allocation of PRBs and other service of the UE.

For example, as noted above, the UE could regularly evaluate the quality of its communication channel with the base station, such as based on SINR and could periodically transmit to the base station a CQI value that represents the UE's determined level of channel quality. And the base station could record in the UE's context record an indication of the UE's latest reported CQI, for use by the base station to determine an appropriate MCS to coordinate for data transmission over the air between the base station and the UE.

And as another example, the UE could also regularly report to the base station the underlying SINR that the UE has computed based on downlink transmission from the base station. And the base station could then use this reported SINR as a basis to determine whether the UE is eligible to receive MU-MIMO service as discussed above, and could record in the UE's context record, based on the UE's latest reported SINR, an indication of whether the UE is currently MU-MIMO eligible.

Further, as another example as noted above, the UE could regularly evaluate the quality or performance of its air interface with the base station and could establish and report to the base station a MIMO rank that would correlate with a number of MIMO layers on which the base station could serve the UE. As discussed above, for instance, rank 1 might map to 1 MIMO layer, rank 2 might map to 2 MIMO layers, and rank 4 might map to 4 MIMO layers, among other possibilities. And the base station could likewise record in the UE's context record an indication of the UE's latest reported MIMO rank, for use by the base station to determine how many MIMO layers to configure for the UE when coordinating data transmission over the air between the base station and the UE.

When the base station schedules data transmission to or from the UE, the base station could designate in its DCI message to the UE not only the PRBs allocated for use to carry the data but also the MCS that is to be used for the transmission and the number of MIMO layers to be used for the transmission.

The base station may also serve multiple connected UEs at a time, and the base station may face a need to schedule data transmissions concurrently to multiple such UEs and/or from multiple such UEs. Because the base station's air interface has a limited number of PRBs per unit time (e.g., per subframe), the base station could implement a scheduling algorithm in an effort to fairly and appropriately allocate the PRBs among the base station's served UEs.

Yet as noted above, the base station may still face load issues. For instance, there could be times when the base station is serving many connected UEs at once and faces a need to schedule data transmissions to many such UEs at once, but the base station does not have sufficient PRBs per unit time to adequately meet the throughput needs of the UEs.

As noted above, the base station could use MIMO to help overcome this problem. In particular, the base station could apply MU-MIMO to facilitate serving multiple UEs at once on the same PRBs as each other, and the base station could serve individual members of the MU-MIMO group with multiple MIMO layers on the shared PRBs. The base station may thereby be able to provide the multiple UEs with a desired level of throughput while also achieving improved spectral efficiency.

As further noted above, one way to provide such MIMO service is with use of a massive-MIMO antenna array. Thus, in an example implementation, the base station's antenna array 14 could be a massive-MIMO array.

Figure 2:
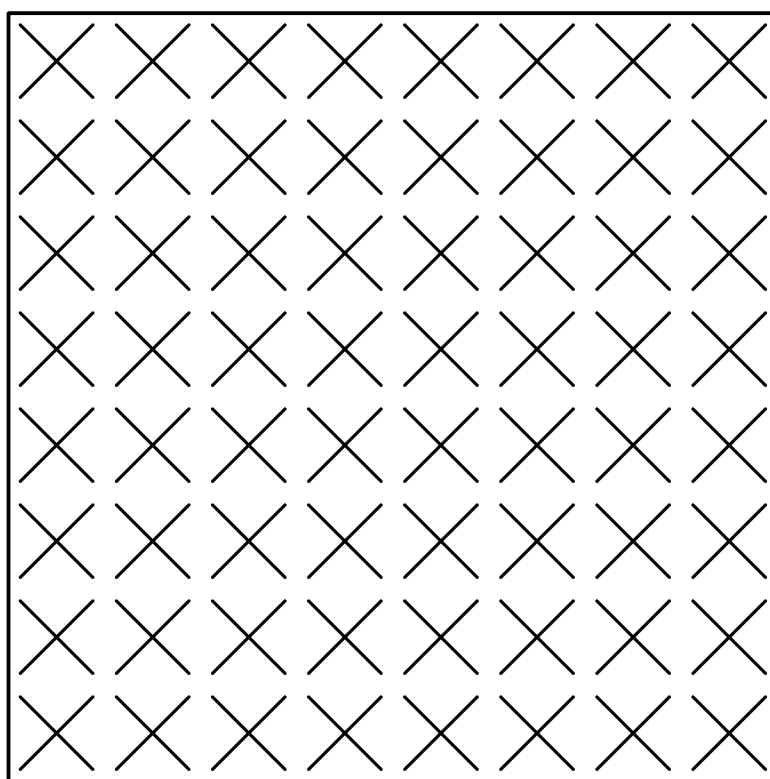
FIG. 2 is a simplified diagram of an example massive-MIMO antenna array that could be implemented according to the disclosure.

FIG. 2 is a simplified diagram of an example massive-MIMO array that could be implemented at base station 12. In this illustration, each X represents two antennas (or antenna elements), one with positive polarization and one with negative polarization. As a result, each column in the example array includes eight antennas with positive polarization and eight antennas with negative polarization. As there are eight columns of antennas, the massive-MIMO array thus has a total of 128 antennas. In a representative implementation, 64 of these antennas could be configured as transmit (downlink) antennas, and the other 64 could be configured as receive (uplink) antennas. For instance, all of the antennas with positive polarization could be configured as transmit antennas, and all of the antennas with negative polarization could be configured as receive antennas.

As discussed above, with this example massive-MIMO antenna array, the base station may be able to provide 16 layers of MIMO transmission. For instance, for each layer, the base station could use 4 of its transmit antennas to provide beamformed transmission defining a respective MIMO layer. Thus, the base station could in theory transmit with up to 16 layers on a common set of air interface resources (e.g., PRBs). Other MIMO arrangements are possible as well. Further, similar processes could be applied for uplink transmission.

As noted, the base station could transmit individual MIMO layers to UEs, by beamforming and/or pre-coding the transmissions. For example, the base station could beamform transmissions to an individual UE by evaluating angle of arrival of uplink signals (e.g., an uplink sounding-reference-signal) from the UE or determining geolocation of the UE, and setting phase and amplitude of downlink transmission from various antenna elements so as to direct the transmission toward the UE. Further, the base station could pre-code individual transmissions to a UE to help the UE distinguish those transmissions from others and extract the transmissions from a combination of received downlink signals. For instance, the base station could transmit one or more downlink modulation reference signals (DMRSs) that the UE can receive and evaluate in order to establish and report channel estimates, and the base station could use those channel estimates as a basis to pre-code transmissions with weighted coefficients that enable the UE to receive and uncover the individual transmissions.

Assuming sufficient orthogonality between UEs of a group, the base station could thus transmit to the UEs of the group on the same PRBs as each other, i.e., at the same time and on the same subcarriers as each other, using DCI messaging to coordinate the transmissions. The transmissions to the UEs would occupy the same PRBs as each other, but would be distinguished from each other through beamforming, pre-coding, and/or one or more other mechanisms. Thus, in each downlink subframe, the base station could allocate a given set of PRBs to each of multiple UEs of a MU-MIMO group and could provide downlink transmission on the allocated PRB(s) respectively to each UE of the MU-MIMO group, using one or more MIMO layers respectively for each UE.

Through this process, the base station could theoretically allocate all of the PRBs of a subframe to a single MU-MIMO group, so that each UE of the MU-MIMO group can receive data transmissions on one or more MIMO layers within all of those PRBs. Alternatively, the base station might allocate some of the PRBs of the subframe to a first MU-MIMO group of UEs and transmit to each of those UEs using one or more MIMO layers on those PRBs, and the base station might allocate other PRBs of the subframe to a second MU-MIMO group of UEs and transmit to each of those UEs using one or more MIMO layers on those PRBs. Further, the base station might allocate some PRBs of the subframe for use without MIMO or in other ways.

As discussed above, the base station may encounter an issue in practice where the base station is heavily loaded, such as with a threshold high number of connected UEs and high PRB utilization, and where a number of the base station's served UEs have MIMO ranks corresponding with service on multiple MIMO layers.

In particular, faced with heavy load, the base station may implement MU-MIMO service to help increase spectral efficiency and meet UE throughput needs. For instance, the base station could refer to its UE context records to identify UEs that are MU-MIMO eligible and, based on the UEs' indicated MIMO ranks, to establish a MU-MIMO group such that the total number of MIMO layers of UEs in the group equals (or approaches) the maximum number of MIMO layers that the base station can support per PRB. But as explained above, if any of the UEs that the base station would include in this MU-MIMO group have a MIMO rank that corresponds with service on multiple MIMO layers, that would restrict the number of UEs that the base station could include in the MU-MIMO group.

As indicated above, the base station can help to avoid or overcome this issue by reducing the MIMO rank of one or more of the base station's served UEs. In particular, the base station could select at least one of the base station's served UEs based at least on the UE having a threshold high HARQ retransmission rate, and the base station could reduce the MIMO rank of that selected UE so that the base station would then serve the UE on a reduced number of MIMO layers. As the base station then establishes a MU-MIMO group including this UE, the base station might thereby be able to include a greater number of UEs in the MU-MIMO group given the base station's maximum number of MIMO layers per PRB and given that the UE will use a reduced number of those MIMO layers.

The base station could carry out this process in response to detecting that the base station has threshold heavy load. For instance, the base station could detect that the base station is serving at least a predefined threshold high number of UEs and that the base station's PRB utilization (e.g. percentage of allocated PRBs per unit time over a latest sliding window) is threshold high. Alternatively or additionally, the base station could detect that the base station has exhausted (e.g., has been exhausting) all of the supported MIMO layers on all of the PRBs of the base station's air interface or all PRBs used for MU-MIMO service. And in response, the base station could then seek to select at least one of the base station's served UEs whose MIMO rank the base station should reduce.

The base station could then query its UE context records to select at least one of the base station's served UEs based on the selected UE being MU-MIMO eligible, the UE having a MIMO rank corresponding with service on multiple MIMO layers (e.g., rank 2 or 4), and the UE having a HARQ retransmission rate that is at least predefined threshold high (e.g., at least 15%).

And the base station could then reduce the MIMO rank of each such selected UE, such as by changing the MIMO rank in the UE's context record and perhaps notifying the UE, so that the base station would then be set to serve that UE using a reduced number of MIMO layers. For instance, the base station may reduce the UE's MIMO rank from 4 to 2, so that the base station would serve the UE on 2 MIMO layers rather than 4 MIMO layers. Or the base station may reduce the UE's MIMO rank from 2 to 1, so that the base station would serve the UE on 1 MIMO layer rather than 2 MIMO layers.

Once the base station has reduced the MIMO rank of a UE, the base station may then include the UE in a MU-MIMO group of UEs that the base station will share on the same PRBs as each other. And as the base station has reduced the MIMO rank of this UE, the base station may serve the UE using a reduced number of MIMO layers on those PRBs.

As further discussed above, the base station could additionally base its selection of such a UE on the UE having had threshold high PRB utilization, such as the base station having served the UE with a transport block size that is at least predefined threshold large, as such a UE may be likely to contribute more to the base station's load issue. To facilitate this, as the base station serves each UE, the base station could maintain in the UE's context record a running average or other statistical measure of the transport block size used for communication with the UE (e.g., over a latest sliding window of time). When querying UE context records to identify a UE to have its MIMO rank reduced, the base station could then look specifically for a UE that is MU-MIMO eligible, that has a MU-MIMO rank corresponding with service on multiple MIMO layers, that has a threshold high HARQ retransmission rate, and that has had a threshold large transport block size (e.g., at least 5,000 bits). And the base station could reduce the MIMO rank of the selected UE.

Note also that the base station's reduction of a UE's MIMO rank could be temporary. For instance, the base station could maintain the reduction until the UE next reports its MIMO rank. Or the base station could set a timer and could revert to the UE's most recently reported MIMO rank upon expiration of the timer.

Figure 3:
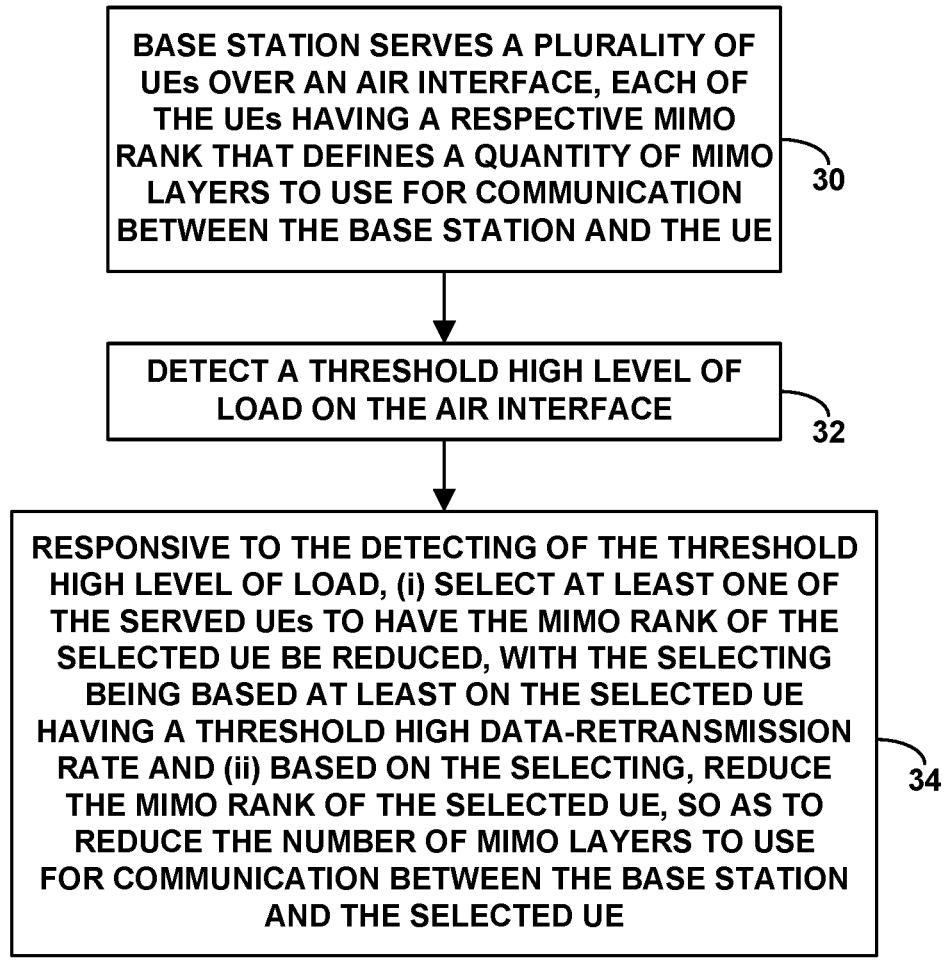
FIG. 3 is a flow chart depicting operations that can be carried out in accordance with the disclosure.

FIG. 3 is next a flow chart depicting a method that can be carried out in accordance with this disclosure, to control communication over an air interface in a wireless communication system. Aspects of this method can be carried out by or on behalf of a base station, such as base station 12 discussed above for instance, among other possibilities.

As shown in FIG. 3, at block 30, the method includes the base station serving a plurality of UEs over the air interface, each of the UEs having a respective MIMO rank that defines a quantity of MIMO layers to use for communication between the base station and the UE. At block 32 (while serving the UEs), the method includes detecting a threshold high level of load on the air interface. And at block 34, the method includes (while still serving the UEs), responsive to at least the detecting of the threshold high level of load, (i) the base station selecting at least one of the served UEs to have the MIMO rank of the selected UE be reduced, with the selecting being based at least on the selected UE having a threshold high data-retransmission rate and (ii) based on the selecting, the base station reducing the MIMO rank of the selected UE, wherein reducing the MIMO rank of the selected UE reduces the number of MIMO layers to use for communication between the base station and the selected UE, and wherein the reduced number of MIMO layers is at least one.

In line with the discussion above, this method could further include the base station configuring MU-MIMO service of a group of UEs including the selected UE, in which case reducing the MIMO rank of the selected UE could result in the reduced number of MIMO layers being used for communication between the base station and the UE in the MU-MIMO service.

Also in line with the discussion above, the act of selecting the UE based at least on the selected UE having a threshold high data-retransmission rate could involve selecting the UE based at least on the UE having at least a predefined threshold high HARQ retransmission rate.

Further, as discussed above, the selecting of the UE to have the MIMO rank of the UE be reduced could be additionally based on one or more other factors, such as (i) the base station serving the UE on at least a predefined threshold large quantity of the PRBs defined by the air interface, such as based on the base station serving the UE with at least a predefined threshold large transport block size, and (ii) the UE having a MIMO rank that corresponds with service on multiple MIMO layers.

Still further, as discussed above, the act of reducing the MIMO rank of the selected UE could involve (i) reducing the MIMO rank of the selected UE from rank 4 corresponding with service on 4 MIMO layers to rank 2 corresponding with service on 2 MIMO layers or (ii) reducing the MIMO rank of the selected UE from rank 2 corresponding with service on 2 MIMO layers to rank 1 corresponding with service on 1 MIMO layer, among other possibilities. And as discussed above, for each UE served by the base station, the base station could store in a UE context record an indication of the MIMO rank of the UE and the base station could be configured to refer to the UE context record to determine the MIMO rank of the UE so as to determine how many MIMO layers to use for communication with the UE. And in that case, the act of reducing the MIMO rank of the selected UE could involve revising the UE context record to indicate the reduced MIMO rank of the selected UE.

Still further, as discussed above, the act of detecting the threshold high level of load on the air interface could take various forms. For instance, the act could involve detecting threshold high PRB-utilization, such as detecting allocation by the base station of a predefined threshold high portion of the PRBs defined by the air interface. Alternatively or additionally, the act could involve detecting exhaustion by the base station of the maximum number of MIMO layers that the base station supports per PRB, such as for one or more particular MU-MIMO groups or generally for the air interface. And still alternatively or additionally, the act could involve detecting the base station serving at least a predefined threshold high number of UEs.

Figure 4:
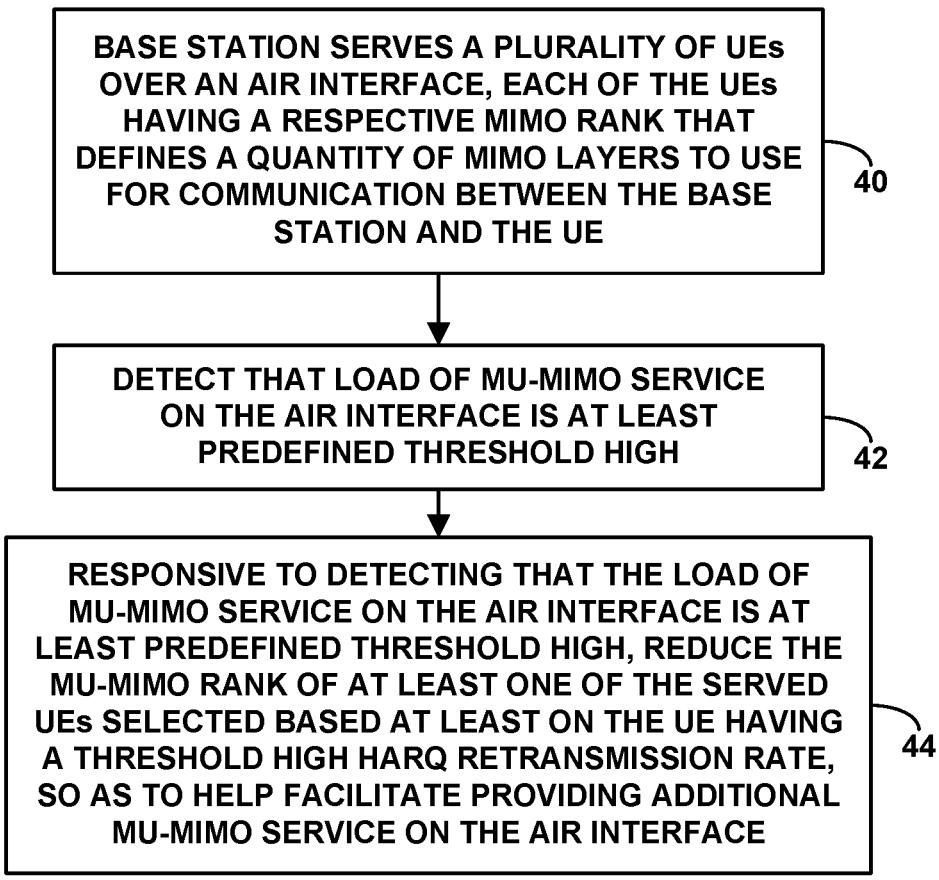
FIG. 4 is another flow chart depicting operations that can be carried out in accordance with the disclosure.

FIG. 4 is next another flow chart depicting a method that can be carried out in accordance with this disclosure, to control communication over an air interface in a wireless communication system. Aspects of this method can likewise be carried out by or on behalf of a base station, such as base station 12, among other possibilities. Further, various features described above can be applied in this context, and vice versa.

As shown in FIG. 4, at block 40, the method includes a base station serving a plurality of UEs over an air interface, each of the UEs having a respective MIMO rank that defines a quantity of MIMO layers to use for communication between the base station and the UE. Further, at block 42 (while serving the UEs), the method involves the base station detecting that load of MU-MIMO service on the air interface is at least predefined threshold high. And at block 44 (also while serving the UEs), the method involves, responsive to at least detecting that the load of MU-MIMO service on the air interface is at least predefined threshold high, the base station reducing the MU-MIMO rank of at least one of the served UEs selected based at least on the UE having a threshold high HARQ retransmission rate, wherein reducing the MU-MIMO rank of the UE may help facilitate providing additional MU-MIMO service on the air interface.

In line with the discussion above, the base station in this method may support use of up to a maximum number of MIMO layers per PRB defined by the air interface, in which case the act of detecting that load of MU-MIMO service on the air interface is at least predefined threshold high could involve detecting that the base station has exhausted the maximum number of MIMO layers per PRB used for MU-MIMO service on the air interface—such as that the base station has already allocated one or more set of the PRBs to UEs whose total number of MIMO layers according to their MIMO ranks is equal to the base station's maximum supported number of MIMO layers per PRB, among other possibilities.

Further, as discussed above, the act of reducing the MIMO rank of the UE could involve (i) reducing the MIMO rank of the UE from rank 4 corresponding with service on 4 MIMO layers to rank 2 corresponding with service on 2 MIMO layers or (ii) reducing the MIMO rank of the UE from rank 2 corresponding with service on 2 MIMO layers to rank 1 corresponding with service on 1 MIMO layer, among other possibilities.

Figure 5:
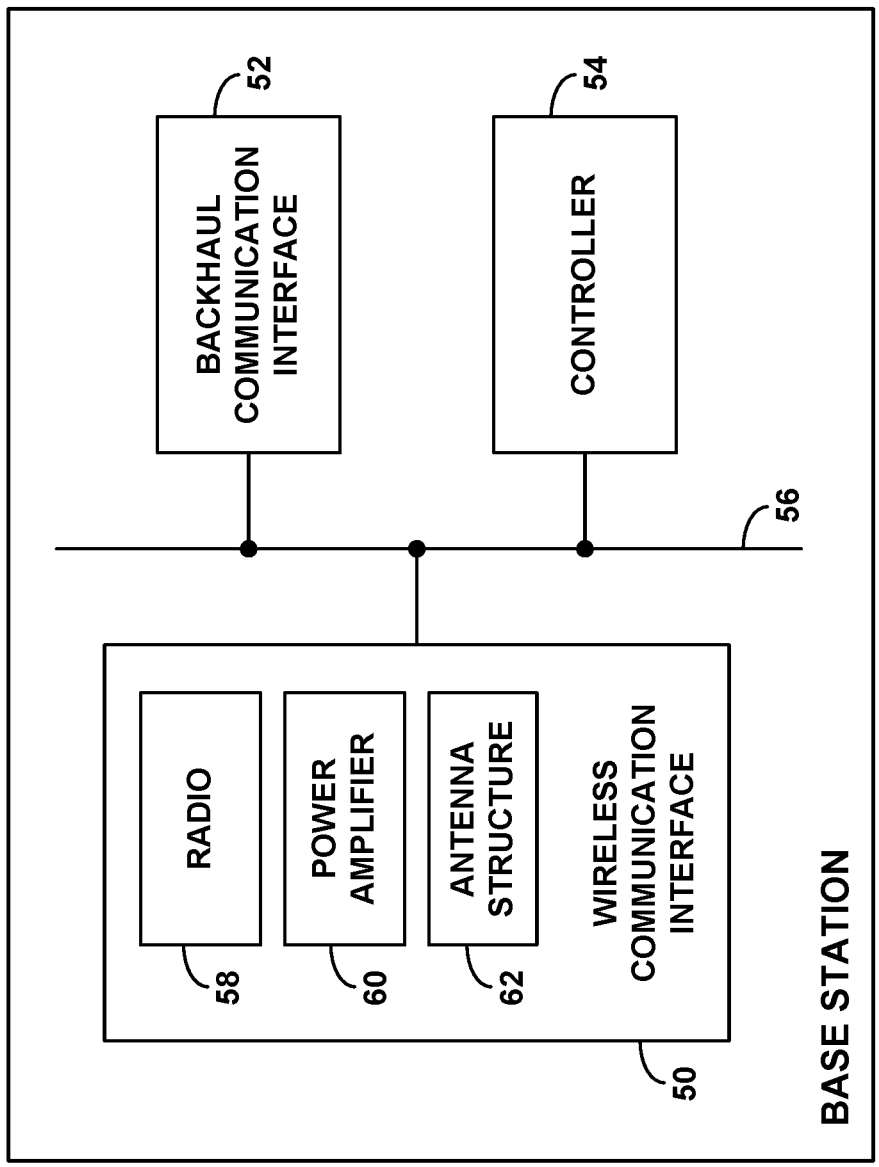
FIG. 5 is a simplified block diagram of a base station operable in accordance with the disclosure.

FIG. 5 is next a simplified block diagram of an example base station that could operate in accordance with the present disclosure, to control communication over an air interface in a wireless communication system. As shown in FIG. 5, the example base station includes a wireless communication interface 50, a backhaul communication interface 52, and a controller 54, which could be integrated together and/or communicatively linked by a network, system bus, or other connection mechanism 56.

Wireless communication interface 50 includes a radio 58, a power amplifier 60, and antenna structure 62. The radio could operate to interface between encoded baseband signals and RF signals. The power amplifier could operate to amplify signals communicated by the antenna structure 62. And the antenna structure 62 could comprise a plurality of antennas for communicating over the air interface, where the air interface defines physical channel resources such as PRBs for carrying data wirelessly between the base station to a plurality of UEs served by the base station. As discussed above, the antenna structure could comprise an antenna array, such as a massive-MIMO array for instance.

Backhaul communication interface 52 could be a network communication interface (e.g., an Ethernet network interface port and/or connection) through which the base station can communicate with various other network entities.

And controller 54 could comprise a processing unit (e.g., one or more processors), non-transitory data storage (e.g., one or more volatile and/or non-volatile storage components such as optical, magnetic, or flash storage), and program instructions stored in the data storage and executable by the processing unit to carry out various operations described herein or could take other forms.

With this or another arrangement, the controller of the base station could thus be configured to detect when load on the air interface is at least predefined threshold high. Further, the controller could be configured to respond to at least the detecting of the load on the air interface being at least predefined threshold high by (i) selecting at least one of the served UEs to have the MIMO rank of the selected UE be reduced, with the selecting being based at least on the selected UE having at least a predefined threshold high HARQ retransmission rate and (ii) based on the selecting, reducing the MIMO rank of the selected UE, wherein reducing the MIMO rank of the selected UE reduces the number of MIMO layers to be used for communication between the base station and the selected UE over the air interface, and wherein the reduced number of MIMO layers is at least one.

Various other features noted above can also be applied in this context, and vice versa.

Exemplary embodiments have been described above. Those skilled in the art will understand, however, that changes and modifications may be made to these embodiments without departing from the true scope and spirit of the invention.

Further, it should be understood that various thresholds and the like described herein can be set by engineering design and or in one or more other ways to help achieve the goals described.

We claim:

1. A method for controlling communication over an air interface in a wireless communication system, the method comprising:
    serving, by a base station, a plurality of user equipment devices (UEs) over the air interface, wherein each of the UEs has a respective Multiple-Input-Multiple-Output (MIMO) rank that defines a quantity of MIMO layers to use for communication between the base station and the UE;
    detecting a threshold high level of load on the air interface; and
    responsive to at least the detecting of the threshold high level of load, (i) selecting by the base station at least one of the served UEs to have the MIMO rank of the selected UE be reduced, wherein the selecting is based at least on the selected UE having a threshold high data-retransmission rate and (ii) based on the selecting, reducing by the base station the MIMO rank of the selected UE, wherein reducing the MIMO rank of the selected UE reduces the number of MIMO layers to use for communication between the base station and the selected UE, wherein the reduced number of MIMO layers is at least one.

2. The method of claim 1, further comprising:
    configuring by the base station Multi-User-MIMO (MU-MIMO) service of a group of UEs including the selected UE, wherein reducing the MIMO rank of the selected UE results in the reduced number of MIMO layers being used for communication between the base station and the selected UE in the MU-MIMO service.

3. The method of claim 1, wherein selecting the UE based at least on the selected UE having a threshold high data-retransmission rate comprises selecting the UE based at least on the UE having at least a predefined threshold high Hybrid Automatic Repeat Request (HARQ) retransmission rate.

4. The method of claim 1, wherein the air interface defines a number of physical resource blocks (PRBs), wherein the selecting of the UE is further based on the base station serving the UE on at least a predefined threshold large quantity of the PRBs.

5. The method of claim 1, wherein selecting of the UE is further based on the base station serving the UE with at least a predefined threshold large transport block size.

6. The method of claim 1, wherein selecting of the UE is further based on the UE having a MIMO rank that corresponds with service on multiple MIMO layers.

7. The method of claim 1, wherein, for each UE served by the base station, the base station stores in a UE context record an indication of the MIMO rank of the UE, wherein the base station is configured to refer to the UE context record to determine the MIMO rank of the UE so as to determine how many MIMO layers to use for communication with the UE, and wherein reducing the MIMO rank of the selected UE comprises revising the UE context record to indicate the reduced MIMO rank of the selected UE.

8. The method of claim 1, wherein reducing the MIMO rank of the selected UE comprises one of (i) reducing the MIMO rank of the selected UE from rank 4 corresponding with service on 4 MIMO layers to rank 2 corresponding with service on 2 MIMO layers or (ii) reducing the MIMO rank of the selected UE from rank 2 corresponding with service on 2 MIMO layers to rank 1 corresponding with service on 1 MIMO layer.

9. The method of claim 1, wherein the air interface defines a number of physical resource blocks (PRBs), wherein detecting the threshold high level of load comprises detecting allocation by the base station of a predefined threshold high portion of the PRBs.

10. The method of claim 9, wherein the base station supports use of up to a maximum number of MIMO layers per PRB, and wherein detecting the threshold high level of load comprises detecting exhaustion by the base station of the maximum number of MIMO layers per PRB.

11. The method of claim 1, wherein detecting the threshold high level of load comprises detecting the base station serving a predefined threshold high number of UEs.

12. A method for controlling communication over an air interface in a wireless communication system, the method comprising:
    serving, by a base station, a plurality of user equipment devices (UEs) over the air interface, wherein each of the UEs has a respective Multiple-Input-Multiple-Output (MIMO) rank that defines a quantity of MIMO layers to use for communication between the base station and the UE;
    detecting by the base station that load of Multi-User MIMO (MU-MIMO) service on the air interface is at least predefined threshold high; and
    responsive to at least detecting that the load of MU-MIMO service on the air interface is at least predefined threshold high, reducing by the base station the MU-MIMO rank of at least one of the served UEs selected based at least on the UE having a threshold high Hybrid Automatic Repeat Request (HARQ) retransmission rate.

13. The method of claim 12, wherein the air interface defines a number of physical resource blocks (PRBs), wherein the base station supports use of up to a maximum number of MIMO layers per PRB, and wherein detecting that load of MU-MIMO service on the air interface is at least predefined threshold high could involve detecting exhaustion by the base station of the maximum number of MIMO layers per PRB used for MU-MIMO service on the air interface.

14. The method of claim 12, wherein reducing the MIMO rank of the UE comprises one of (i) reducing the MIMO rank of the UE from rank 4 corresponding with service on 4 MIMO layers to rank 2 corresponding with service on 2 MIMO layers or (ii) reducing the MIMO rank of the UE from rank 2 corresponding with service on 2 MIMO layers to rank 1 corresponding with service on 1 MIMO layer.

15. A base station operable in a wireless communication system to control communication over an air interface, the base station comprising:

an antenna array comprising a plurality of antennas for communicating over the air interface, wherein the air interface defines physical resource blocks (PRBs) for carrying data wirelessly between the base station and a plurality of user equipment devices (UEs) served by the base station, wherein each UE has a respective Multiple-Input-Multiple-Output (MIMO) rank that defines a quantity of MIMO layers to be used for communication between the base station and the UE over the air interface; and a controller, wherein the controller is configured to detect when load on the air interface is at least predefined threshold high, and wherein the controller is configured to respond to at least the detecting of the load on the air interface being at least predefined threshold high by (i) selecting at least one of the served UEs to have the MIMO rank of the selected UE be reduced, wherein the selecting is based at least on the selected UE having at least a predefined threshold high Hybrid Automatic Repeat Request (HARQ) retransmission rate and (ii) based on the selecting, reducing the MIMO rank of the selected UE, wherein reducing the MIMO rank of the selected UE reduces the number of MIMO layers to be used for communication between the base station and the selected UE over the air interface, wherein the reduced number of MIMO layers is at least one.

16. The base station of claim 15, wherein the controller comprises a processing unit, non-transitory data storage, and program instructions stored in the non-transitory data storage and executable by the processing unit to carry out at least the detecting, the selecting, and the reducing.

17. The base station of claim 15, wherein the controller is further configured to configure Multi-User-MIMO (MU-MIMO) service of a group of UEs including the selected UE, wherein reducing the MIMO rank of the selected UE results in the reduced number of MIMO layers being used for communication between the base station and the selected UE in the MU-MIMO service.

18. The base station of claim 15, wherein the selecting of the UE is further based on the base station serving the UE with at least a predefined threshold large transport block size.

19. The base station of claim 15, wherein the selecting of the UE is further based on the UE having a MIMO rank that corresponds with service on multiple MIMO layers.

20. The base station of claim 19, wherein reducing the MIMO rank of the selected UE comprises one of (i) reducing the MIMO rank of the selected UE from rank 4 corresponding with service on 4 MIMO layers to rank 2 corresponding with service on 2 MIMO layers or (ii) reducing the MIMO rank of the selected UE from rank 2 corresponding with service on 2 MIMO layers to rank 1 corresponding with service on 1 MIMO layer.

\* \* \* \* \*